(12) United States Patent  
Chen

(10) Patent No.: US 8,726,088 B2  
(45) Date of Patent: May 13, 2014

(54) METHOD FOR PROCESSING BOOTING ERRORS

(75) Inventor: Chia-Hsiang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 247 days.

(21) Appl. No.: 13/351,996

(22) Filed: Jan. 17, 2012

(65) Prior Publication Data

US 2013/0138939 A1 May 30, 2013

(30) Foreign Application Priority Data

Nov. 25, 2011 (TW) .............................. 100143447 A

(51) Int. Cl.
*G06F 11/00* (2006.01)
(52) U.S. Cl.
USPC ............................................................ 714/36
(58) Field of Classification Search
USPC ........ 714/22–26, 30, 31, 36, 37, 39–41, 47.1, 714/47.2
See application file for complete search history.

(56) References Cited

U.S. PATENT DOCUMENTS

| 6,367,022 | B1 * | 4/2002 | Gillespie et al. | 713/300 |
| 6,944,779 | B2 * | 9/2005 | Alexander et al. | 713/300 |
| 7,290,128 | B2 * | 10/2007 | Habib | 713/2 |
| 7,331,062 | B2 * | 2/2008 | Alagna et al. | 726/23 |

FOREIGN PATENT DOCUMENTS

| TW | 512275 | 12/2002 |
| TW | 200731061 | 8/2007 |
| TW | 201109913 | 3/2011 |

* cited by examiner

*Primary Examiner* — Nadeem Iqbal
(74) *Attorney, Agent, or Firm* — Morris Manning & Martin LLP; Tim Tingkang Xia, Esq.

(57) ABSTRACT

A method for processing booting errors for a computer having multiple voltage regulator downs (VRDs) includes reading a boot sequence including multiple power-on stages, and each power-on stage corresponds to a boot voltage and one of the VRDs; performing the power-on stages according to the boot sequence, and determining whether an output voltage of the VRD corresponding to each power-on stage is equal to the corresponding boot voltage; and when the output voltage of any one of the VRDs is not equal to the corresponding boot voltage, performing a debugging procedure.

6 Claims, 6 Drawing Sheets

METHOD FOR PROCESSING BOOTING ERRORS

CROSS-REFERENCE TO RELATED APPLICATIONS

This non-provisional application claims priority under 35 U.S.C. §119(a) on Patent Application No(s). 100143447 filed in Taiwan, R.O.C. on Nov. 25, 2011, the entire contents of which are hereby incorporated by reference.

BACKGROUND

1. Technical Field

The present disclosure relates to a method for processing booting errors, and more particularly to a method for processing booting errors for a computer having multiple voltage regulator downs (VRDs).

2. Related Art

With the development of information technology, electronic devices based on processors such as various types of computers have already been widely used by enterprises and individuals. When the computer is booted up, multiple VRDs of the computer firstly adjust the power from a power supplier to the voltage required by a hardware device such as the central processing unit (CPU) or the hard disk according to a boot sequence (also known as a boot device sequence), and then provide the voltage for the hardware. Next, the VRDs adjust the power of the power supplier to the voltage required by another hardware device, and then provide the voltage for it according to the boot sequence. However, in the booting procedure, some VRD may output an improper voltage to the corresponding hardware device, causing a booting failure or even burnout of the hardware device.

To avoid the above problems, generally, the voltages outputted during the implementation of the boot sequence are continuously monitored during the booting process, and if an error is detected, the computer is directly rebooted or shut down. However, users for developing or maintaining a computer can only know that the computer has been rebooted or shut down due to an error, but have no idea of the circumstance of the computer where the error occurs. In such a case, the user can neither figure out which VRD or other hardware causes the error, nor perform measurement and analysis based on the status of the error. In other words, when a voltage error occurs during the booting of a computer, it is difficult for the conventional method to monitor, debug or further test.

SUMMARY

The present disclosure relates to a method for processing booting errors for a computer having multiple VRDs. The method comprises: reading a boot sequence (also known as a boot device sequence) comprising multiple power-on stages, and each power-on stage corresponds to a boot voltage and one of the VRDs; performing the power-on stages according to the boot sequence, and determining whether an output voltage of the VRD corresponding to each power-on stage is equal to the corresponding boot voltage; and when the output voltage of any one of the VRDs is not equal to the corresponding boot voltage, performing a debugging procedure.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
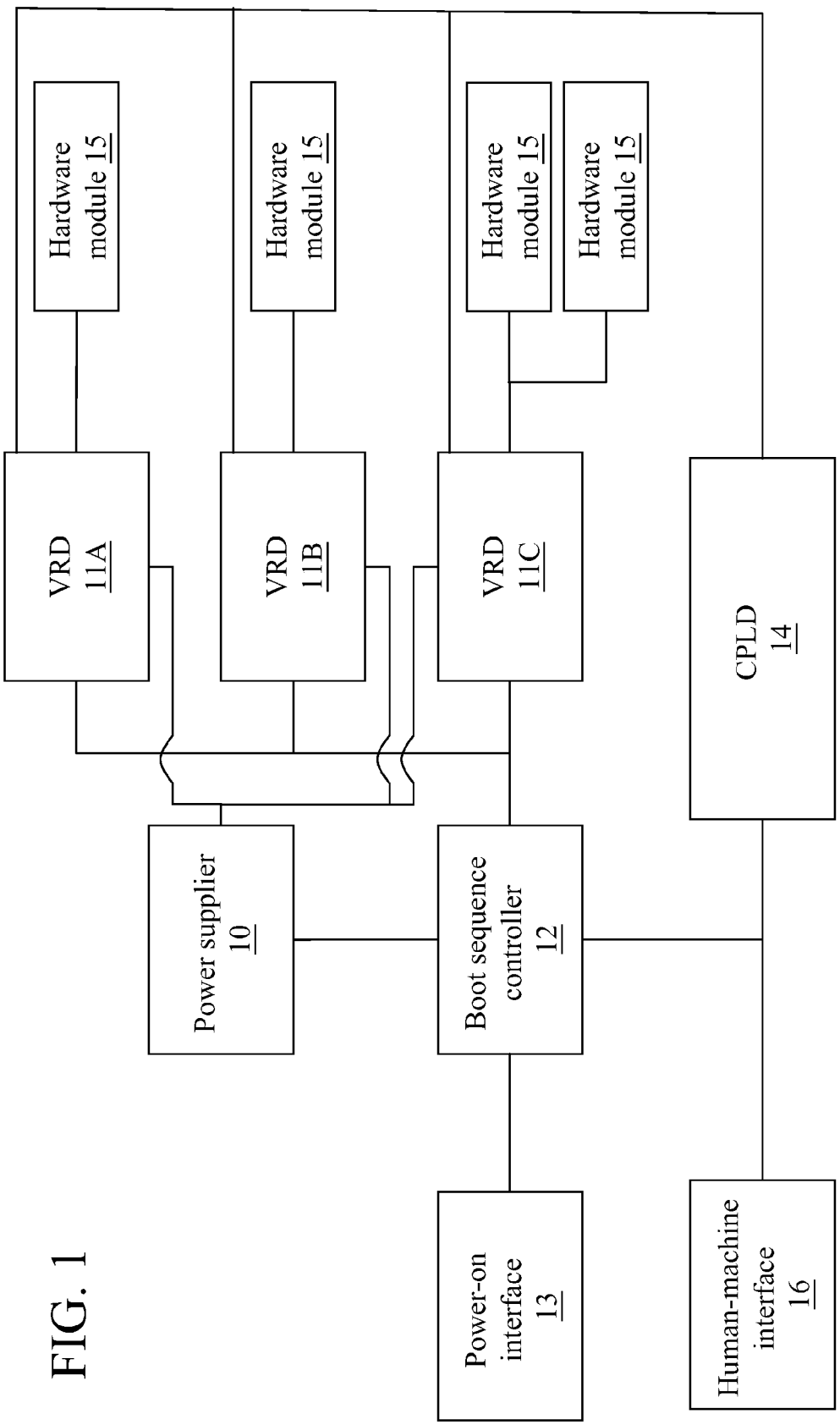
FIG. 1 is a schematic block view of a computer according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed features and advantages of the present disclosure will be described in detail in the following embodiments. Those skilled in the art can easily understand and implement the content of the present disclosure. Furthermore, the relative objectives and advantages of the present disclosure are apparent to those skilled in the art with reference to the content disclosed in the specification, claims, and drawings.

Some embodiments of the present disclosure provide a method for processing booting errors for a computer having multiple VRDs.

FIG. 1 is a schematic block view of a computer according to an embodiment of the disclosure.

The computer may comprise a power supplier 10, multiple VRDs 11A, 11B, and 11C (hereinafter altogether referred to as VRDs 11), a boot sequence controller 12, a power-on interface 13, a complex programmable logic device (CPLD) 14, and multiple hardware modules 15. The computer is, for example but not limited to, a desk-top computer, a notebook computer, a tablet computer, or a hand-held computer. The power-on interface 13 may be a power-on button. A user may send a trigger command by the power-on interface 13 to the boot sequence controller 12, so as to start the computer. In some embodiments, the boot sequence controller 12 may also be integrated with the CPLD 14 as a single device.

Each VRD 11 is connected to the power supplier 10, the boot sequence controller 12, and at least one of the hardware modules 15. The VRD 11 is configured to convert the voltage provided by the power supplier 10 into a boot voltage required by the hardware module 15 connected thereto according to a command from the boot sequence controller 12. Each VRD 11 corresponds to a boot voltage which can be, for example, 6.5 V, 5 V, 3.3 V, 1.5 V or 1.1 V.

The method for processing booting errors is performed the CPLD 14. The CPLD 14 may be connected to the boot sequence controller 12 and each VRD 11 to detect whether a booting error occurs, and then to process the error in time. The CPLD 14 may be disposed on a baseboard (not shown) of a computer or disposed on a test board independent from the baseboard.

Figure 2:
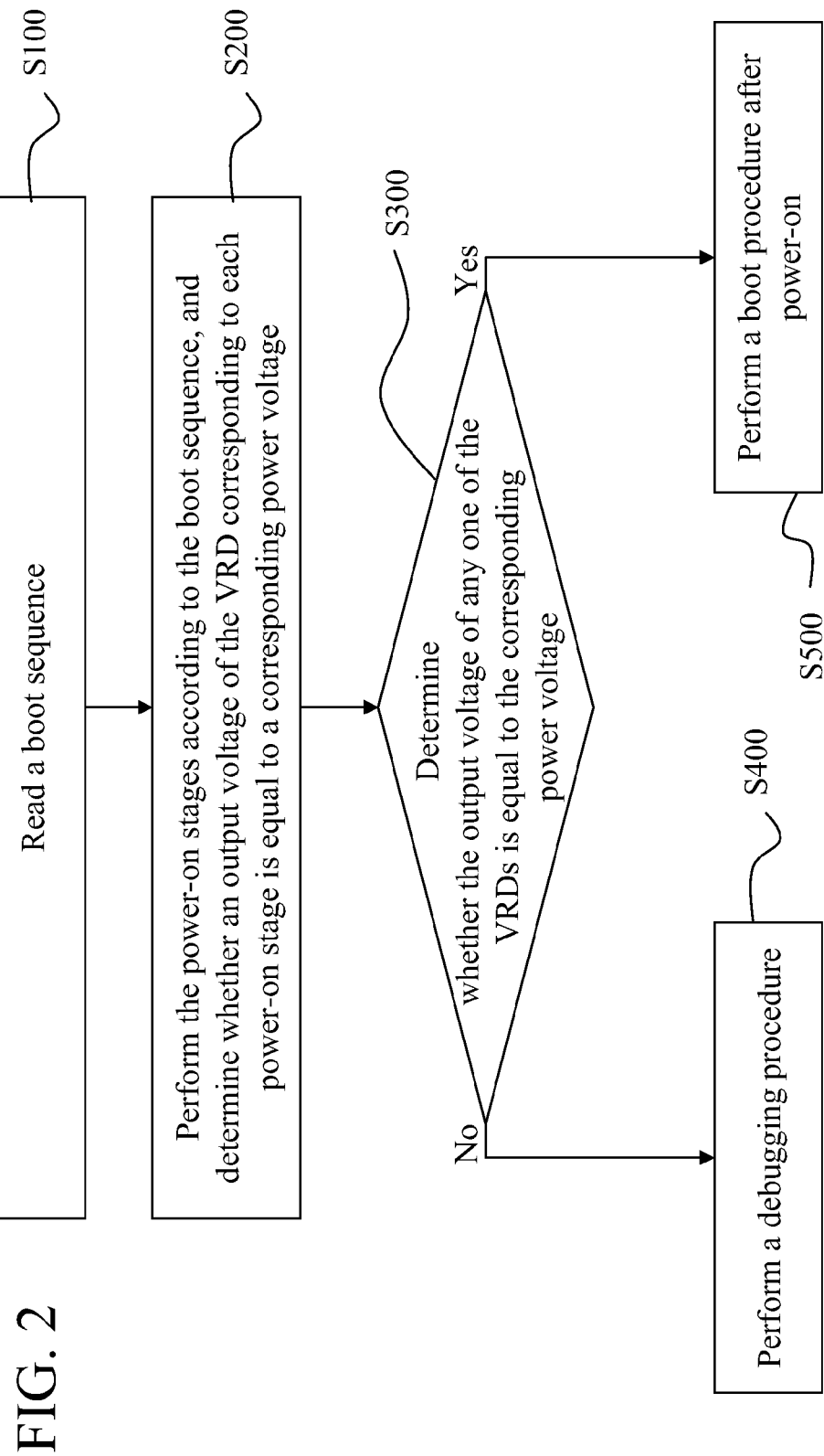
FIG. 2 is a flowchart of a method for processing booting errors according to an embodiment.

FIG. 2 is a flowchart of the method for processing booting errors according to an embodiment of the disclosure.

Firstly, the boot sequence controller 12 reads a boot sequence (Step S100). The boot sequence comprises multiple power-on stages, each of which corresponds to a boot voltage and one of the VRDs 11. In other words, each power-on stage, the VRD 11, and the boot voltage may correspond to each other. For example, the first, the second, and the third power-on stages may respectively correspond to output boot voltages of 6.5 V, 3.3 V, and 1.1 V and the VRD 11 configured to output the voltages of 6.5 V, 3.3 V, and 1.1 V.

The boot sequence controller 12 then sequentially performs each power-on stage according to the boot sequence and determines whether an output voltage of the VRD 11 corresponding to each power-on stage is equal to the corresponding boot voltage (Step S200). Furthermore, the boot sequence controller 12 determines whether the output voltage of any one of the VRDs 11 is equal to the corresponding boot voltage (Step S300). If the output voltage of any one of the VRDs 11 is not equal to the corresponding boot voltage, it is considered a boot error.

Figure 3:
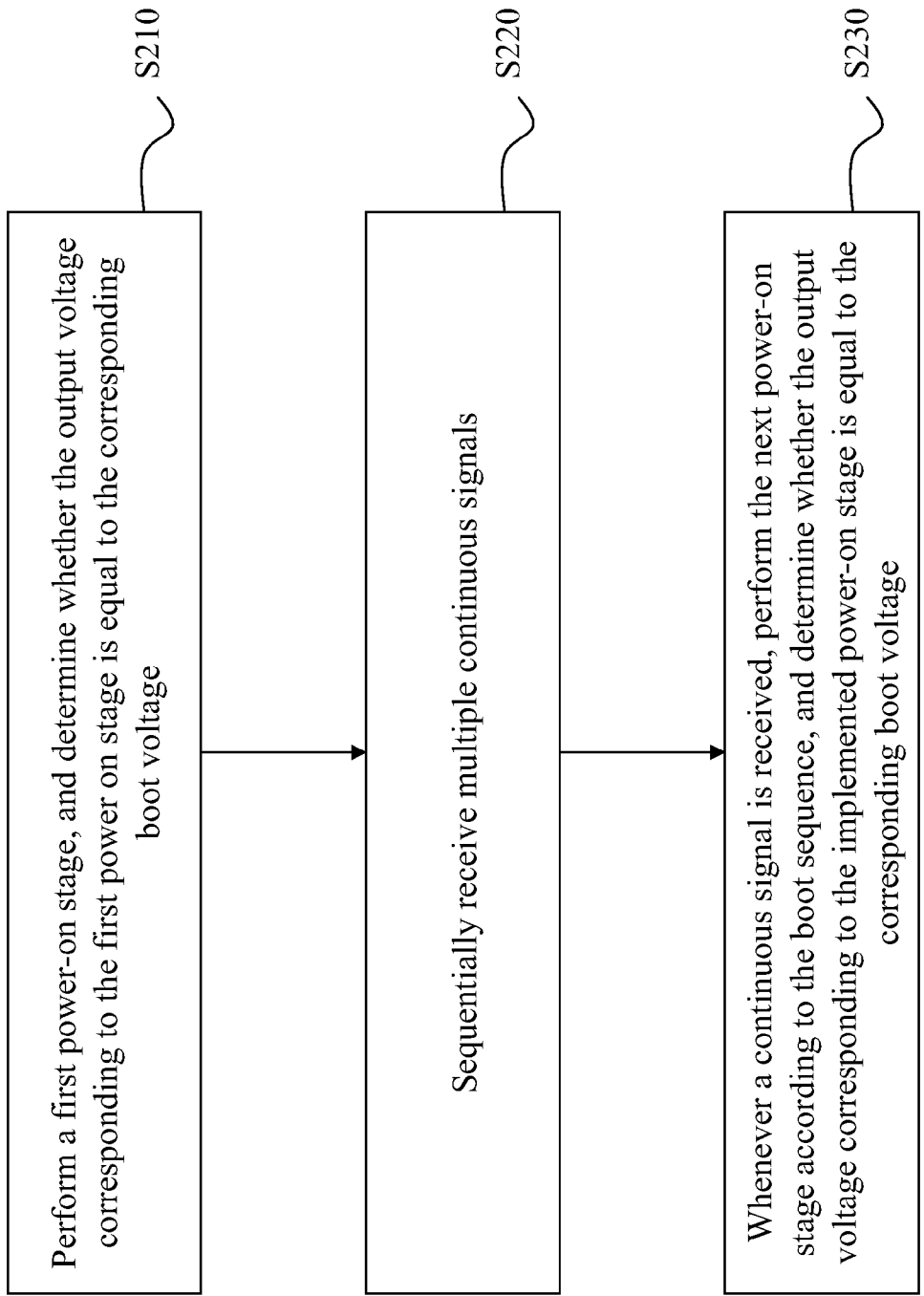
FIG. 3 is a flowchart of Step S200 according to an embodiment.

FIG. 3 is a flowchart of Step S200 according to an embodiment of the disclosure. In this embodiment, the method for processing booting errors may provide a human-machine interface 16 to the user, so that the user may determine whether a booting error occurs in each power-on stage. The human-machine interface 16 may be a button disposed on a baseboard or an independent test board. The human-machine interface 16 sends a continuous signal to the boot sequence controller 12 or the CPLD 14 when the button is pressed.

The boot sequence controller 12 firstly performs the first power-on stage, and determines whether an output voltage corresponding to the first power-on stage is equal to the corresponding boot voltage (Step S210). The boot sequence controller 12 then sequentially receives multiple continuous signals (Step S220). When receiving a continuous signal, the boot sequence controller 12 performs the next power-on stage according to the boot sequence, and determines whether the output voltage corresponding to the implemented power-on stage is equal to the corresponding boot voltage (Step S230).

In other words, the user may manipulate the human-machine interface 16 after determining that the booting is normal in the first power-on stage. The next power-on stage is implemented after the boot sequence controller 12 or the CPLD 14 receives the continuous signal. In some embodiments, the method for processing booting errors may also monitor whether a boot error occurs in each power-on stage.

Furthermore, multiple interrupt points may be set in the boot sequence controller 12 or the CPLD 14, and one or more power-on stages may be arranged between every two interrupt points. When receiving a continuous signal, the boot sequence controller 12 may continuously perform one or more power-on stages until reaching the next interrupt point.

In an embodiment, the method for processing booting errors may determine whether a boot error occurs by a power-good signal sent from the VRD 11. When the VRD 11 adjusts the voltage provided by the power supplier 10 to the desired boot voltage, the VRD 11 will output the power-good signal to the boot sequence controller 12. The CPLD 14 can directly monitor the power-good signal from the VRD 11 or indirectly obtains the power-good signal from the boot sequence controller 12.

The first power-on stage is performed in Step S210, and when a power-good signal is received in the first power-on stage, it can be determined that the output voltage corresponding to the first power-on stage is equal to the corresponding boot voltage. That is, if a power-good signal is received, it is determined that the booting is normal. When no power-good signal is received during a determination period of the first power-on stage, the output voltage corresponding to the first power-on stage is detected to determine whether the detected output voltage is equal to the corresponding boot voltage. Furthermore, if no power good signal is received but the output voltage is detected to be equal to the corresponding boot voltage, the next power-on stage may be performed after a period of time. This case is not regarded as a booting error.

Similarly, the next power-on stage is performed in Step S230 according to the boot sequence. When a power-good signal is received when performing the next power-on stage, it is determined that the output voltage corresponding to the power-on stage is equal to the corresponding boot voltage. On the contrary, if no power-good signal is received in a determination period of the power-on stage, the output voltage corresponding to the power-on stage is detected, and it is determined whether the detected output voltage is equal to the corresponding boot voltage.

When the boot sequence controller 12 determines that the output voltage of any one of the VRDs 11 is not equal to the corresponding boot voltage, a debugging procedure is performed (Step S400). On the contrary, when the output voltage of each of the VRDs 11 is equal to the corresponding boot voltage, a booting procedure after powering on is performed (Step S500). More particularly, after performing a power-on stage, the boot sequence controller 12 can determine whether the power-on stage having been performed is the last one in the boot sequence. If no boot error occurs after performing the last power-on stage, the booting procedure after power-on is performed to transfer the control right to a basic input/output system (BIOS) of the computer which will complete the whole booting operation.

Figure 4:
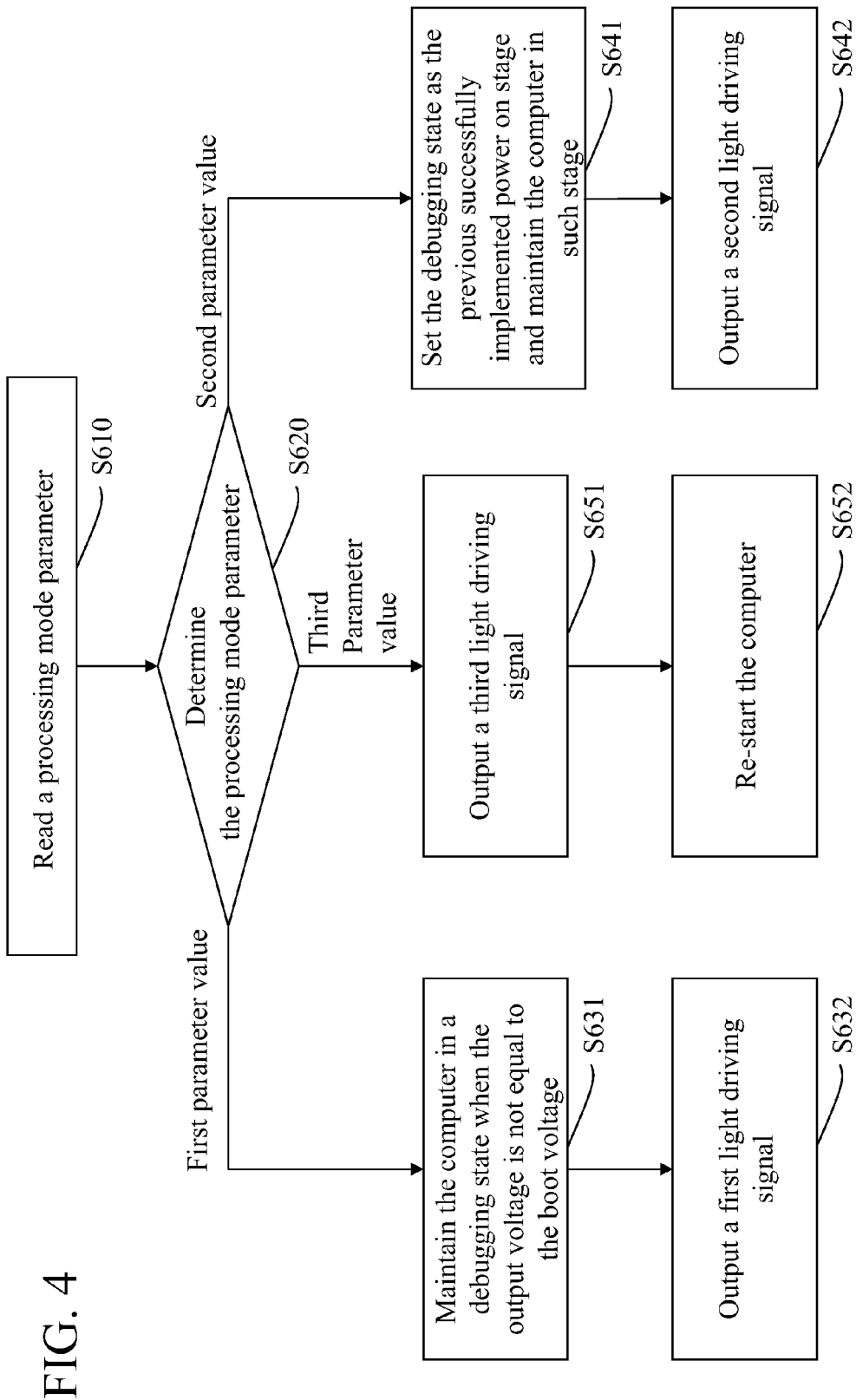
FIG. 4 is a flowchart of a debugging procedure according to an embodiment.

In an embodiment, the debugging procedure may process a booting error in different methods according to a processing mode parameter. FIG. 4 is a flowchart of a debugging procedure according to an embodiment of the disclosure.

The debugging procedure reads the processing mode parameter (Step S610) and determines the processing mode parameter (Step S620). The processing mode parameter may be received by a switch, a jumper, or a baseboard management controller (BMC). Different values of the processing mode parameter represent different processing methods. In this embodiment, the processing mode parameter may be a first parameter value, a second parameter value, or a third parameter value.

When the processing mode parameter is the first parameter value, the debugging procedure maintains the computer in a debugging state that the output voltage is not equal to the boot voltage (Step S631). The debugging procedure also outputs a first light driving signal (Step S632) to make at least one light-emitting unit (for example, a light-emitting diode (LED)) of the computer flash on and off. As such, the user may know that a booting error occurs in the current power-on stage according to the flash mode caused by the first light driving signal, and that the computer is maintained in the error state. In this manner, in the debugging state the user may measure and analyze the power supplier 10, the VRD 11, or other hardware module 15 that may cause such error.

The CPLD 14 may also perform a measurement and analysis procedure or notify the BMC to perform measurement and analysis, so as to obtain parameters required by preset testing items and then to analyze them. The CPLD 14 may be connected to the hardware module 15 for measurement or analysis. For example, the measurement and analysis procedure may be that once a booting error occurs, the output voltage of the VRD 11 where the error occurs and the time when the error occurs are recorded. Further, for example, the measurement and analysis procedure may automatically detect the temperature of the CPU of the computer when the booting error occurs.

Similarly, when the processing mode parameter is the second parameter value, the debugging procedure may set the debugging state as the previous successfully performed power-on stage to prevent the current booting error from damaging the computer and maintain the computer in such stage (Step S641). The debugging procedure can also output a second light driving signal (Step S641) to notify the user of the occurrence of the booting error.

When the processing mode parameter is the third parameter value, the debugging procedure firstly notifies the user of a booting error by continuously outputting a third light driving signal in a period of time (Step S651), and then restarts the computer (Step S652). In addition, in some embodiments, Step S610 may be performed before Step S200 to acquire the processing method in advance.

The method for processing booting errors may also have a burnout prevention mechanism to prevent the hardware module 15 maintaining in a debugging state from being burnt out due to an improper voltage.

Figure 5:
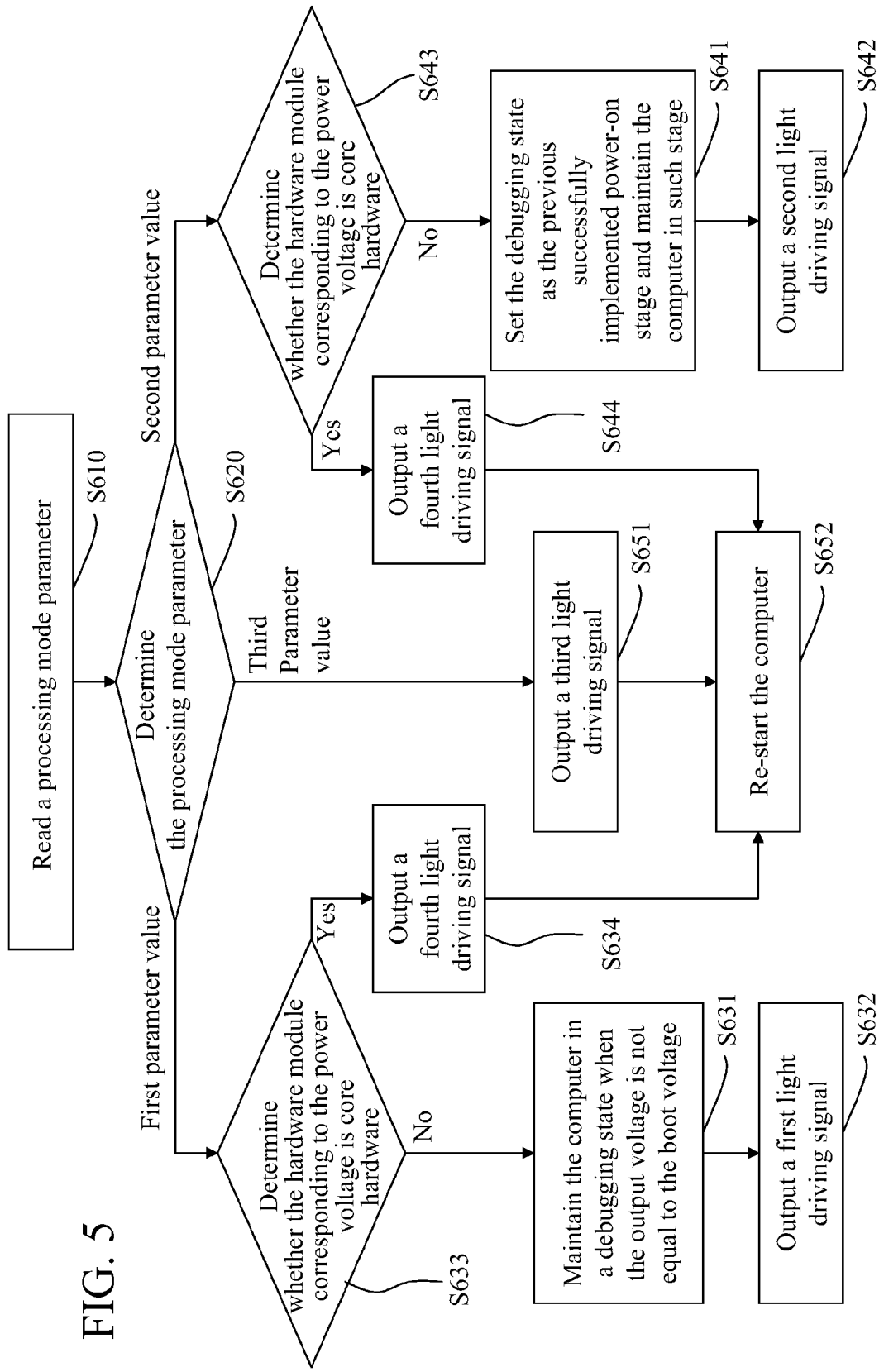
FIG. 5 is a flowchart of a debugging procedure according to another embodiment.

FIG. 5 is a flowchart of a debugging procedure according another embodiment of the disclosure. When the processing mode parameter is the first parameter value, the debugging procedure determines whether the hardware module 15 corresponding to the boot voltage is core hardware (Step S633). The core hardware means a key hardware module 15 in a computer such as the CPU or main memory. Generally, the core hardware requires a low boot voltage and may easily be burnt out. For example, the CPU generally requires a boot voltage of 1.1 V to 1.5 V. When it is determined that at least one of the hardware modules 15 corresponding to the boot voltage is the core hardware, the debugging procedure performs an exception procedure. The exception procedure may output a fourth light driving signal (Step S634) and then restart the computer (Step S652).

Similarly, when the processing mode parameter is the second parameter value, the debugging procedure also can determine whether the hardware module 15 corresponding to the boot voltage is the core hardware (Step S643). When at least one of the hardware modules 15 corresponding to the boot voltage is determined to be the core hardware, a fourth light driving signal is output (Step S644) and the computer is restarted (Step S652).

Figure 6:
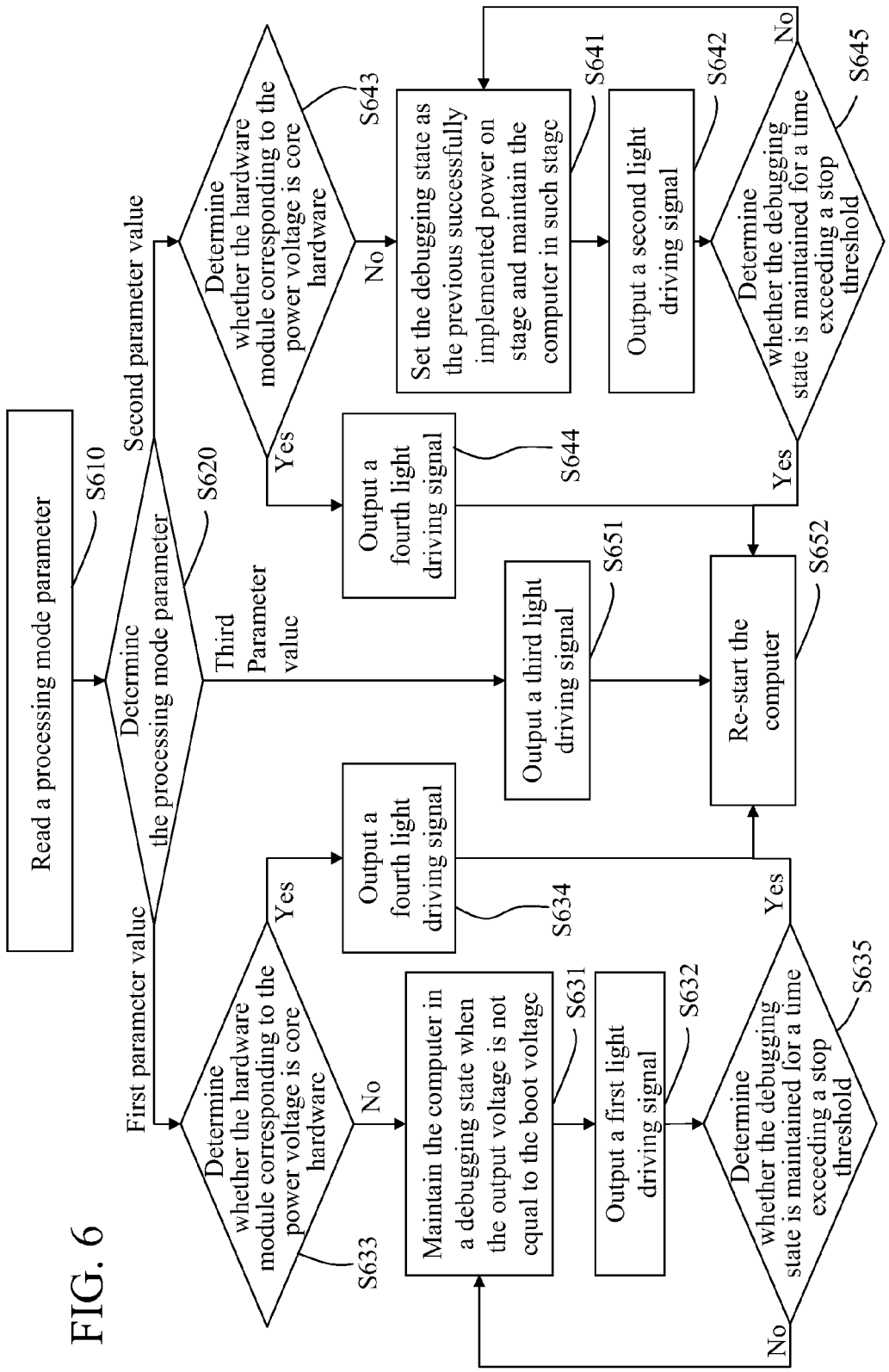
FIG. 6 is a flowchart of a debugging procedure according to still another embodiment.

FIG. 6 is a flowchart of a debugging procedure according to still another embodiment of the disclosure.

When the computer is maintained at a debugging state, the debugging procedure may use a timer to count how long the computer is maintained in the debugging state. The debugging procedure also determines whether the time period during which the computer maintains in the debugging state exceeds a threshold (Step S635 or S645). If the time period exceeds the threshold, the computer is restarted to prevent the hardware module 15 from being burnt out. If the time period does not exceed the threshold, the computer may still maintain in the debugging state.

Steps S633, S634, S635, S643, S644, S645, and S652 make up the burnout prevention mechanism which prevents the hardware module 15 from being damaged due to the erroneous output voltage.

In view of the above, the method for processing booting errors detects whether the VRD outputs an improper voltage in each power-on stage and maintains the computer in the debugging state when an error occurs so that the user can perform measurement and analysis on the relevant hardware module. To prevent the hardware module from being burnt out due to the erroneous output voltage, the method also provides a burnout prevention mechanism. Further, the method for processing booting errors receives the continuous signal by the human-machine interface, so that the user sequentially tests each power-on stage. Therefore, the user may not only know the whole state of the computer, but also record the current error circumstance when the error occurs and then perform a debugging procedure or further tests.

What is claimed is:

1. A method for processing booting errors for a computer having multiple voltage regulator downs (VRDs), comprising:

reading a boot sequence which comprises multiple power-on stages, and each power-on stage corresponding to a boot voltage and one of the VRDs;

performing the power-on stages according to the boot sequence, and determining whether an output voltage of the VRD corresponding to each power-on stage is equal to the corresponding boot voltage; and when the output voltage of any one of the VRDs is not equal to the corresponding boot voltage, performing a debugging procedure, wherein the debugging procedure comprises:

reading a processing mode parameter;

when the processing mode parameter is a first parameter value, performing the following steps:

maintaining the computer in a debugging state that the output voltage is not equal to the boot voltage; and outputting a first light driving signal; and when the processing mode parameter is a second parameter value, performing the following steps:

setting the debugging state as the previous successfully performed power-on stage and maintaining the computer in such stage; and outputting a second light driving signal.

2. The method according to claim 1, wherein when the processing mode parameter is the first parameter value, further performing the following steps:

when a time period that the debugging state maintains for exceeds a threshold, restarting the computer.

3. The method according to claim 1, wherein when the processing mode parameter is the second parameter value, further performing the following steps:

when a time period that the debugging state maintains for a time exceeds a threshold, restarting the computer.

4. The method according to claim 1, wherein the debugging procedure further comprises:

when the processing mode parameter is a third parameter value, performing the following steps:

outputting a third light driving signal; and restarting the computer.

5. The method according to claim 1, wherein the computer comprises multiple hardware modules, each of the hardware modules corresponds to one of the boot voltages, and when the processing mode parameter is the second parameter value, further performing the following steps:

when at least one of the hardware modules corresponding to the boot voltage is a core hardware, performing an exception procedure, the exception procedure comprises:

outputting a fourth light driving signal; and restarting the computer.

6. The method according to claim 1, wherein the computer comprises multiple hardware modules, each of the hardware modules corresponds to one of the boot voltages, and when the processing mode parameter is the first parameter value, performing the following steps:

when at least one of the hardware modules corresponding to the boot voltage is a core hardware, performing an exception procedure, the exception procedure comprises:

outputting a fourth light driving signal; and restarting the computer.

* * * * *